United States Patent [19]

Cordero et al.

[11] Patent Number: 4,635,504
[45] Date of Patent: Jan. 13, 1987

[54] TRANSMISSION SYSTEMS FOR MOTOR VEHICLES WITH FOUR-WHEEL DRIVE

[75] Inventors: Federico Cordero; Roberto Faldella, both of Turin, Italy

[73] Assignee: Fiat Auto S.p.A., Italy

[21] Appl. No.: 630,805

[22] Filed: Jul. 13, 1984

[51] Int. Cl.[4] .................... F16H 37/08; F16H 37/06
[52] U.S. Cl. ......................................... 74/695; 74/705
[58] Field of Search .................. 74/705, 710, 665 F, 74/695; 180/248

[56] References Cited

U.S. PATENT DOCUMENTS

| | | | |
|---|---|---|---|
| 1,965,266 | 7/1934 | Starr | 74/695 |
| 3,659,480 | 5/1972 | Koivunen | 74/695 |
| 4,073,358 | 2/1978 | Szalai | 74/710 X |
| 4,341,281 | 7/1982 | Nagy | 74/710 X |
| 4,352,301 | 10/1982 | Fleury | 74/710 X |
| 4,520,690 | 6/1985 | Dangel | 74/705 X |
| 4,523,495 | 6/1985 | Sala | 74/695 X |

FOREIGN PATENT DOCUMENTS 0043806 1/1982 European Pat. Off. .

Primary Examiner—Kenneth J. Dorner
Assistant Examiner—David Novais
Attorney, Agent, or Firm—Sughrue, Mion, Zinn, Macpeak and Seas

[57] ABSTRACT

In a transmission system for four-wheel-drive motor vehicles with a front-mounted engine and gearbox disposed transverse the longitudinal axis of the motor vehicle, of the type including a front differential and an intermediate differential both housed in a casing rigid with the gearbox, the intermediate differential is located within a part of the gearbox while the front differential is housed in a separate casing fixed to the gearbox. The steps necessary to adapt a system provided initially for front-wheel drive only so as to also allow rear-wheel drive is thus simplified.

1 Claim, 2 Drawing Figures

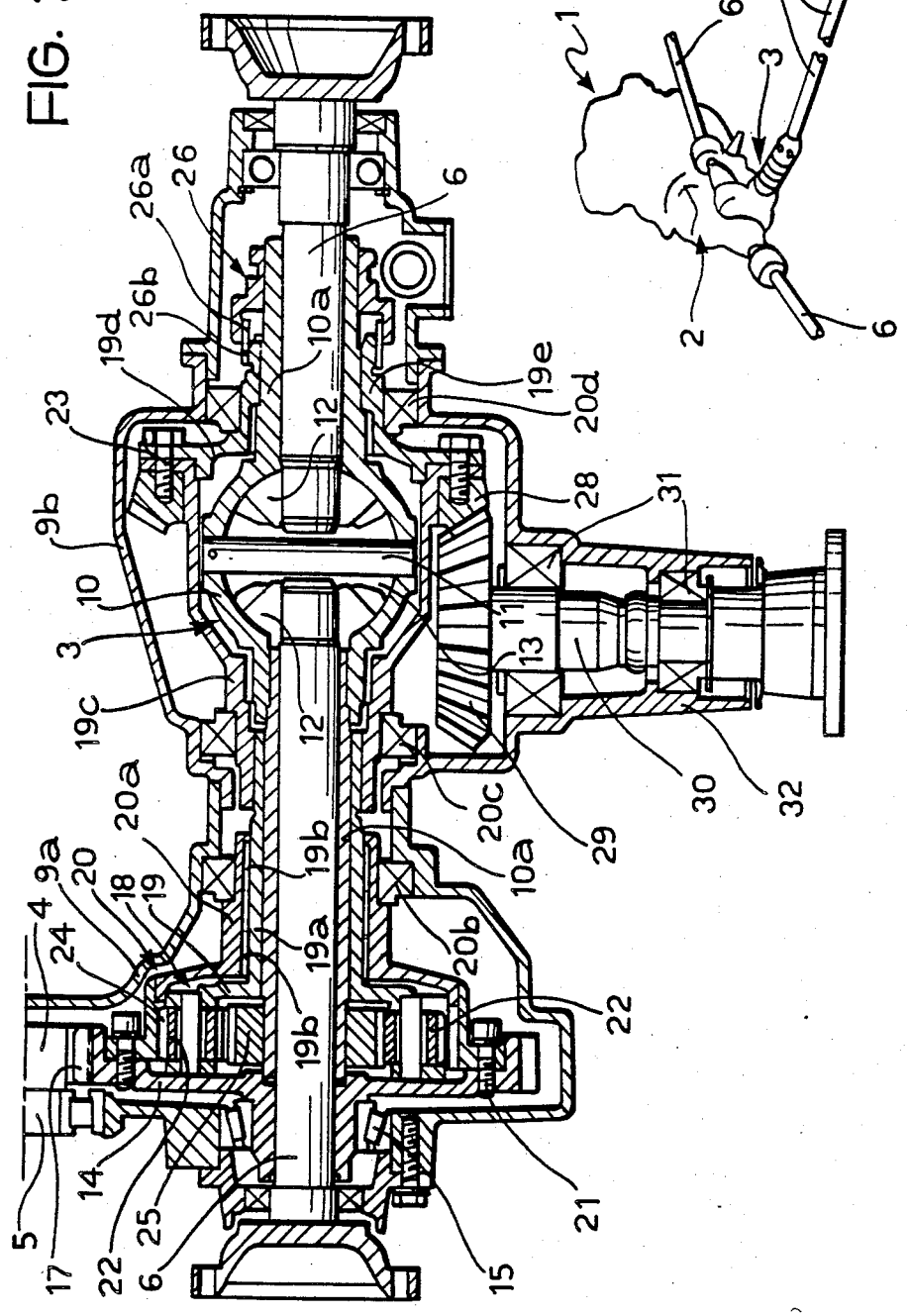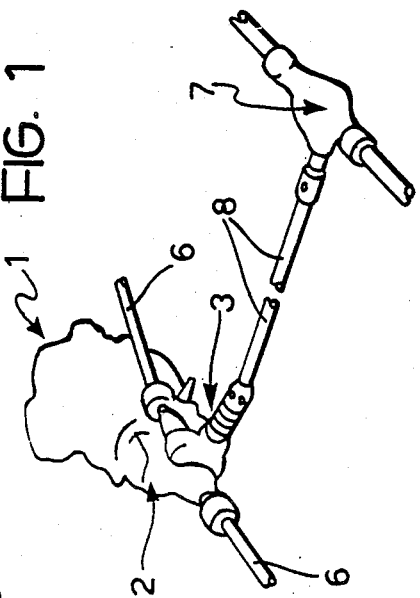

TRANSMISSION SYSTEMS FOR MOTOR VEHICLES WITH FOUR-WHEEL DRIVE

The present invention relates to transmission systems for motor vehicles with a front-mounted engine and gearbox disposed transverse the longitudinal axis of the motor vehicle, of the type comprising:

a front differential having a cage driven by a gear carried by the driven shaft of the gearbox, for transmitting torque to the front wheels of the motor vehicle;

a rear differential for transmitting torque to the rear wheels of the motor vehicle;

an intermediate differential constituted by an epicyclic train housed with the front differential in a casing rigid with the gearbox, the epicyclic train including:

a ring gear driven by the said gear carried by the driven shaft of the gearbox;

a sun wheel rigid with the cage of the front differential, and a freely-rotatable planet carrier carrying a series of planet wheels interposed between the sun wheel and the ring gear;

a bevel gear rigid with the planet carrier of the intermediate differential, and a bevel pinion meshing with the bevel gear and connected kinematically to the rear differential.

A transmission system of this type is described and illustrated in 'European Patent Specification No. 0043,806 published Sept. 12, 1984.

The object of the present invention is to provide a transmission system of the type specified above, which is simple and cheap to construct.

The main characteristic of the invention lies in the fact that the epicyclic train is housed in a part of the gearbox while the front differential is housed in a separate casing fixed to the gearbox.

By virtue of this characteristic, the steps needed to adapt a transmission system provided initially for front-wheel drive only so as to also allow rear-wheel drive is made simpler and cheaper in that the gearbox does not have to be modified.

Further characteristics and advantages of the invention will become apparent from the description which follows with reference to the appended drawings, provided purely by way of non-limiting example, in which:

FIG. 1 is a schematic perspective view of the transmission system according to the invention and FIG. 2 is a partially-sectioned view of a detail of the transmission system of FIG. 1.

In FIG. 1, an internal combustion engine, generally indicated 1, is intended for mounting in the front part of a motor vehicle with its axis transverse the longitudinal axis of the motor vehicle. The engine 1 has a gearbox 2 of the constant-mesh type, having a main shaft and a driven shaft (not illustrated) which also extend transverse the longitudinal axis of the motor vehicle.

A front differential, indicated 3 (see FIG. 2 also), is driven by a gear 4 carried by the driven shaft 5 of the gearbox 2 by means of an epicyclic train 18 which, as will be explained below, acts as an intermediate differential. The front differential 3 transmits torque to the front wheels of the motor vehicle though two half shafts 6.

As illustrated in FIG. 1, the transmission system further includes a rear differential 7 for transmitting torque to the rear wheels of the motor vehicle, which is connected by a propeller shaft 8 to the epicyclic train 18 acting as the intermediate differential in a manner which will be described in detail below.

In a manner similar to that illustrated in the prior European Patent Specification No. 0043,806 the front differential 3 and the intermediate differential 18 (see FIG. 2) are both housed in a casing rigid with the gearbox. The system according to the present invention differs from the previous solution, however, in that the intermediate differential 18 is housed in a part 9a of the gearbox while the front differential 3 is housed in a separate casing 9b fixed to the gearbox 9a. Thus, when it is wished to adapt a transmission system provided initially for front-wheel drive only so as to allow rear-wheel drive as well, it is not necessary to modify the gearbox, making the steps needed for the adaptation simpler and cheaper.

The differential 3 is of the known type having a cage 10 with two opposing hubs 10a within which are rotatably mounted the half shafts 6 for transmitting torque to the front wheels of the motor vehicle. Two crown wheels 12 are mounted on the facing ends of the two half shafts 6 and mesh with two side gears 13 (only one of which is shown in FIG. 2) rotatably supported in their turn, on a pin 11 fixed in the cage 10.

A gear, indicated 14, is rotatably mounted within the gearbox by tapered roller bearings 15. The gear 14 has an external ring gear 17 meshing with the gear 4 carried by the driven shaft 5 of the gearbox.

As described above, the epicyclic train 18 acts as an intermediate differential and is able to divide the torque correctly between the front differential 3 and the rear differential 7 of the transmission system. This epicyclic train includes a planet carrier 19 having a hub 19a surrounding the respective hub 10a of the cage 10. The hub 19a is freely rotatably mounted within a hub 20a by rollers 19b. The hub 20a forms part of a gear 20 fixed by bolts 21 to the gear 14 and is rotatably mounted within the gearbox by means of a rolling bearing 20b.

The planet carrier 19 carries a plurality of meshing pairs of planet wheels 22. The planet wheels of each pair mesh one with an internal ring gear 24 of the gear 20 and the other with a sun wheel 25 rigid with the cage 10 of the front differential.

A bell-shaped member 19c fixed to the hub 19a of the planet carrier 19 of the intermediate differential 18 extends within the casing 9b and surrounds the cage 10 of the front differential. The bell member 19c is rotatable within the casing 9b by means of a rolling bearing 20c. A gear 19d is fixed on the larger-diameter end of the bell member 19c by screws 23, and is rotatably mounted within the casing 9b by a rolling bearing 20d. The gear 19d includes a hub 19e which surrounds the hub 10a of the cage 10 located on the opposite side from the epicyclic train 18.

A sleeve, indicated 26, is mounted by a splined coupling on the hub 10a and is provided with teeth 26a for engaging corresponding teeth 26b on the hub 19e. The sleeve 26 is movable axially by known means (not shown) between a disengaged position (illustrated in FIG. 2) in which the planet carrier 19 of the epicyclic train 18 is free to rotate relative to the cage 10 of the front differential, and an engaged position in which the planet carrier and the cage are rigid with each other, thus allowing the engagement of the intermediate differential.

A bevel gear 28 meshing with a bevel pinion 29 for transmitting drive to the rear differential 7 is mounted on the bell member 19c rigid with the planet carrier 19 of the epicyclic train 18. The bevel pinion 29 is located at one end of a shaft 30 rotatably mounted by rolling bearings 31 within a cylindrical projection 32 forming part of the casing 9b. The end of the shaft 30 opposite the bevel pinion 29 is intended for connection to the propeller shaft 8 by a constant-velocity universal joint to transmit torque to the cage of the rear differential 7.

In operation, torque is transmitted to the half shafts 6 of the front wheels by the gear 4 carried by the driven shaft of the gearbox through the gear 14, the ring gear 24, the planet wheels 22, the sun wheel 25, and the cage 10 of the front differential.

At the same time torque is also transmitted to the shaft 30 for driving the rear differential by the cage 10 of the front differential (assuming that the sleeve 26 is in its disengaged position ) through the sun wheel 25, the planet wheels 22, the planet carrier 19 and the bevel gear pair 28, 29. If the sleeve 26 is in its position of engagement with the teeth 26b, the gear 28 moves with the cage 10 of the front differential. Thus in this latter condition, the intermediate differential is isolated.

Naturally, the principle of the invention remaining the same, the constructional details and forms of embodiment may be varied widely with respect to that described purely by way of example, without thereby departing from the scope of the present invention.

We claim:

1. A transmission system for a motor vehicle having a front-mounted engine and gear box disposed transversely to the longitudinal axis of the motor vehicle wherein said gear box includes a gear box casing and a driven shaft having an output gear rotatably mounted in said gear box casing, said transmission system comprising an additional casing separate from said gear box casing, connecting means joining said gear box casing to said additional casing, a front differential located in said additional casing and having a cage operatively coupled to said output gear carried by said driven shaft and a pair of half shafts for transmitting torque to front wheels respectively of the motor vehicle, a rear differential for transmitting torque to rear wheels of the motor vehicle, and an intermediate differential constituted by an epicyclic gear train housed within said gear box casing, the epicyclic train including a ring gear driven by said output gear carried by said driven shaft, a sun wheel rigid with said cage of said front differential and a planet carrier carrying a series of planet wheels interposed between said sun wheel and said ring gear, a bell shaped member surrounding said cage in said additional casing, first and second bearing means adjacent said connecting means, said first bearing means rotatably supporting said ring gear and said second bearing means rotatably supporting said bell shaped member in their respective casings, the connecting means being located between both bearing means, said bell shaped member being rigidly coupled to said planet carrier of said intermediate differential, a beveled gear carried by said bell shaped member, a bevel pinion rotatably mounted in said additional casing in meshing engagement with said beveled gear and shaft means kinematically connecting said pinion to said rear differential whereby said intermediate differential divides the torque from said gear box between said front and rear differentials.

* * * * *

UNITED STATES PATENT AND TRADEMARK OFFICE
CERTIFICATE OF CORRECTION

PATENT NO.  :  4,635,504

DATED       :  January 13, 1987

INVENTOR(S) :  Federico CORDERO and Roberto FALDELLA

It is certified that error appears in the above-identified patent and that said Letters Patent is hereby corrected as shown below:

On the title page, the following should be inserted

-- [30]   Foreign Application Priority Data

July 13, 1983   Italy   [IT]..........................67760/83 --.

Signed and Sealed this

Sixth Day of October, 1987

Attest:

DONALD J. QUIGG

Attesting Officer

Commissioner of Patents and Trademarks